Aug. 5, 1930.  M. H. ROBERTS  1,772,289
LOCOMOTIVE POWER REVERSE GEAR
Filed July 31, 1925  3 Sheets-Sheet 2
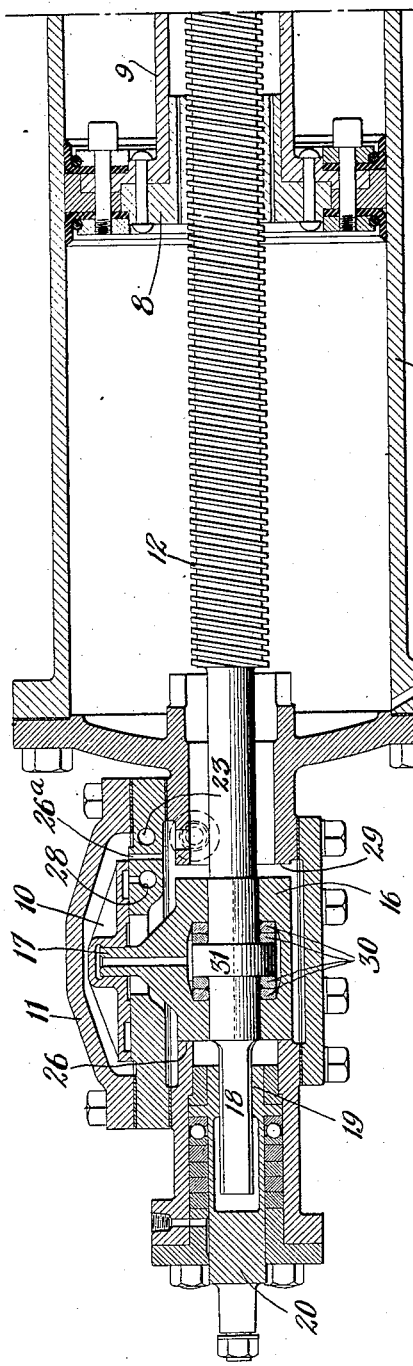
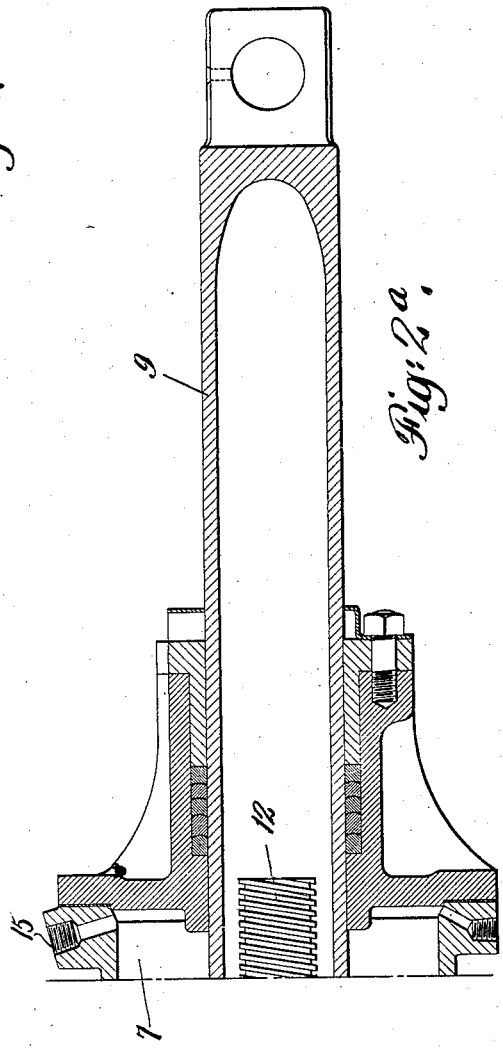
Inventor
Montague H Roberts
By Attorneys

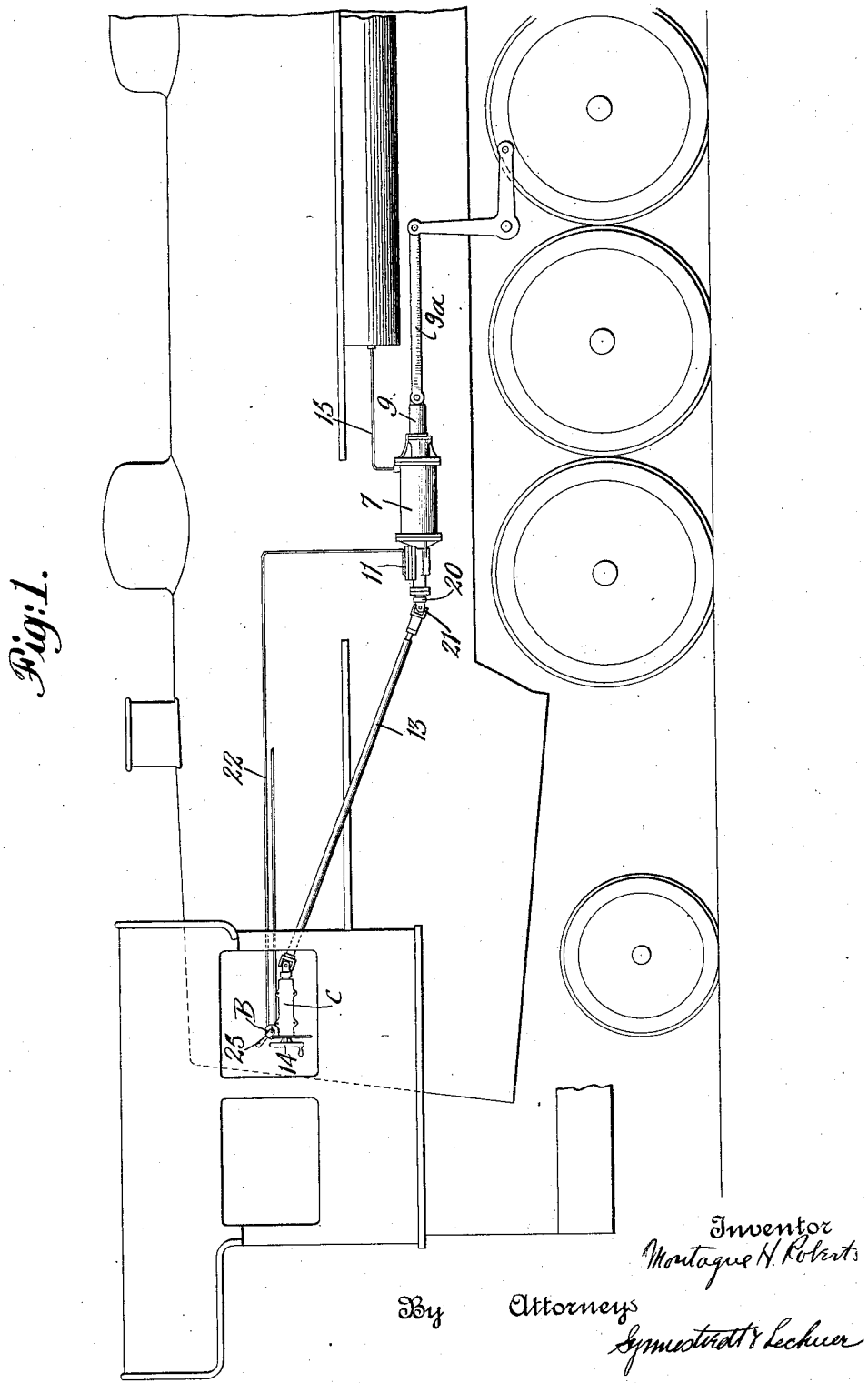

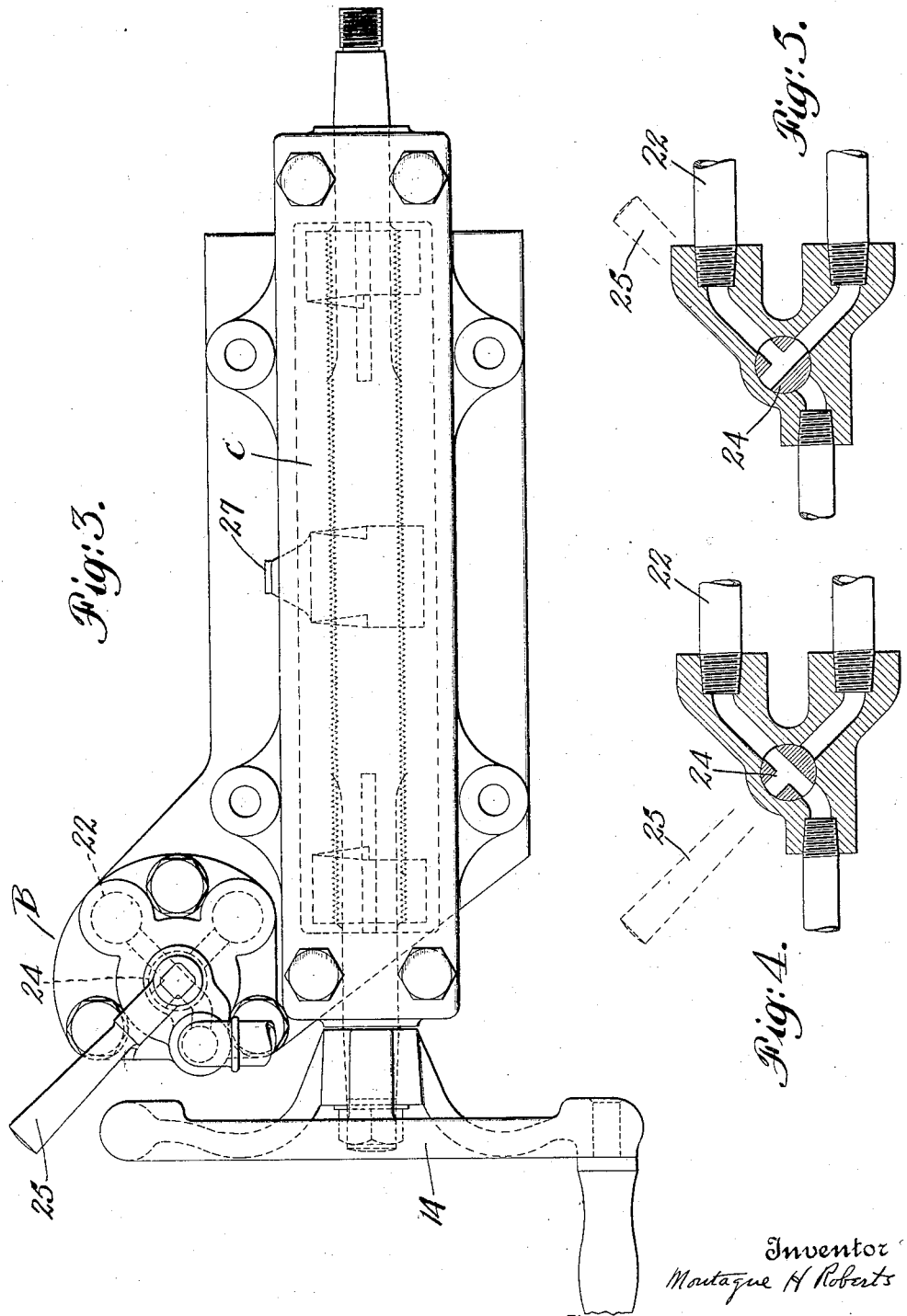

Patented Aug. 5, 1930

1,772,289

UNITED STATES PATENT OFFICE

MONTAGUE H. ROBERTS, OF ENGLEWOOD, NEW JERSEY, ASSIGNOR TO FRANKLIN RAILWAY SUPPLY COMPANY, A CORPORATION OF DELAWARE

LOCOMOTIVE POWER REVERSE GEAR

Application filed July 31, 1925. Serial No. 47,237.

This invention relates to power reverse gears and it is particularly useful as applied to locomotive service in connection with which it will be described.

Reverse gears may be generally divided into two types, one in which the parts are entirely mechanically operated and the other in which fluid pressure is employed as the operating medium, the latter type being now almost exclusively specified for locomotive work.

Locks have been proposed to lock the piston in its selected position of cut-off, the fixing of the piston in its adjusted positions being particularly advantageous in connection with the valve motion gearing having long valve travel, now being employed. The use of locks, however, introduces mechanical complications as well as undesirable characteristics from an operating standpoint.

I propose by the present invention to provide a power reverse gear which, altho it does not employ a lock, is nevertheless held in any of its selected positions of cut-off adjustment as tho it were locked. I further propose that this gear shall be adjusted to effect cut-off adjustment by fluid pressure, the device at the same time being capable of manual operation in the event that there is no air pressure on the locomotive or in the event that there should be a failure of air pressure while on the road.

More specifically, I propose a power reverse gear, in which the piston is mechanically limited in any and all of its selected positions of cut-off adjustment as against movement from such selected position of cut-off in one direction, and held against movement from selected position in the opposite direction by fluid pressure serving to overcome any load or thrusts encountered in service.

How the foregoing, together with such other objects as may hereinafter appear, or are incident to my invention, are realized, is illustrated in preferred form in the accompanying drawings, wherein Fig. 1 is a diagrammatic side elevation of a locomotive having a power reverse gear embodying my improvements;

Fig. 2 is a large sectional view taken thru a portion of the gear.

Fig. 2ª is a similar sectional view showing the remaining portion of the gear, and Figs. 3, 4 and 5 are views illustrating details of the invention.

Referring now to the drawings, the gear comprises the cylinder 7; the piston 8, to the rod 9 of which, the reach rod 9ª is connected; the valve 10 in the valve chest 11; the servo governor connection 12 between the valve and the piston; the shaft 13 by which the valve is manually operated thru the medium of the hand wheel 14 when it is desired to effect cut-off adjustment; and the control mechanism B.

Air from the reservoir is supplied to the front end of the cylinder by the pipe 15, the front face of the piston being always subject to the full reservoir pressure as long as there is air on the locomotive for purposes which will be set forth.

The servo motor or servo governor connection 12 between the valve 10 and the piston 8 comprises a screw shaft threaded into the piston, the piston rod being hollow for this purpose, and the collar-like member 16 having a tongue 17 adapted to engage the slide valve 10 as shown in Fig. 2. The shaft 12 has a squared end 18 fitting into a similar recess 19 in the stub shaft 20 to which the shaft 13 is connected by a suitable universal joint 21.

When the hand wheel 14 is turned, the valve 10 is moved to admit pressure to shift the piston to effect cut-off adjustment, as follows:

The shaft 13 causes the shaft 12 to rotate and since the piston acts as a nut by virtue of its mass, the shaft 12 moves longitudinally of the piston carrying with it collar 16 which causes the valve to move to cover or uncover the ports to be described.

As above stated, there is reservoir pressure against the forward face of the piston. I prefer to have no pressure on the rear face of the piston save only at such times as the device is being operated to effect cut-off adjustment. To this end I provide the control device B which controls the pressure supply from the reservoir thru the pipe 22 and port 23 to the valve chest. The control device B comprises the valve 24 which in one position connects the valve chest with the atmosphere and in its other position connects the valve chest with the reservoir. This valve is operated by means of the handle 25 and normally the valve is left in a position connecting the chest with the atmosphere so that there is no pressure in the chest and consequently none on the rear face of the piston. The pressure on the front face of the piston, therefore, always operates when the valve 24 is in the position just described to hold the piston in a position in which the collar 16 abuts against the stop 26. This stop mechanically limits the piston as against movement in one direction from any selected position of cut-off and the pressure on the forward face of the piston holds the piston against movement in the opposite direction from any position of cut-off adjustment. By making the cylinder and piston of proper size, any desired degree of pressure may be exerted on the forward face of the piston. I prefer to have from six to eight thousand pounds pressure. That is to say, a pressure in excess of any forward thrust or pull which will be exerted under service conditions. At this point it is mentioned that the load on the piston is generally in the forward direction.

Assuming now that it is desired to manually shift the valve to move the piston to effect cut-off adjustment, the handle 25 is thrown so that the valve 24 connects the steam chest and the reservoir, whereupon pressure enters the chest and flows thru the port 26$^a$ into the rear end of the cylinder 7. In this connection it is pointed out that with the piston in any selected position of cut-off adjustment the port 26$^a$ would always be open so that immediately upon the throwing of the handle 25 pressure will enter the rear end of the cylinder. As soon as pressure thus enters the rear end of the cylinder, the thrust of the piston and screw 12 against the stop 26 is relieved and the hand wheel can be freely turned. The hand wheel is turned until the pointer 27 of the indicator C registers opposite the cut-off graduation to which it is desired to adjust the parts. Assuming that it is desired to shift the piston from the position shown to a full forward position with maximum cut-off, the hand wheel is rotated to the right which moves the screw shaft 12 to the rear carrying with it the valve 10. Pressure, however, has built up in the rear end of the cylinder and is pushing the piston forwardly which carries the screw forward and, of course, the valve also. Hence, it is necessary to rotate the handwheel sufficiently rapidly to keep the valve 10 in a position uncovering the port 26$^a$. This can be readily done because the piston is being moved by the differential pressure between its opposite faces and, therefore, merely moves forward steadily. As the hand wheel is thus being turned, the pointer 27 moves forwardly and when the pointer reaches the maximum cut-off graduation, the hand wheel is no longer rotated. The piston, however, continues to move forwardly for a short distance, causing the valve 10 to connect the port 26$^a$ with the exhaust port 28. The handle 25 is thrown to connect the valve chest with the atmosphere, preferably as soon as the engineman ceases to turn the handle 14. In consequence of the connecting of the ports 26$^a$ and 28, reservoir pressure causes the piston to move rearwardly until the collar 16 engages the stop 26, at which time port 26$^a$ is uncovered and remains uncovered. Any leakage from the front face to the rear face of the piston, therefore, exhausts to the atmosphere and the parts are held against the stop 26 by full reservoir pressure operating on the forward face of the piston. When the piston has thus been returned until rearward movement thereof is limited by the stop 26, it is in the selected position of cut-off. In other words, all that has happened is that the distance between the rear face of the collar 16 and the piston has been altered so that when the piston comes to rest with the collar 16 against the stop 26, it will be in the position giving the desired cut-off. The turning of the hand wheel a definite amount will secure a corresponding definite altering of the distance between the rear face of the collar 16 and the piston so that the indicator 27 will always indicate the precise cut-off and since the piston is always returned to the stop, the engineman knows that his piston must be in the position giving the precise cut-off registered by his indicator.

If now it is desired to cut back, the handle 25 is first thrown to connect the valve chest and the reservoir so as to introduce pressure to the rear face of the piston to relieve the thrust on the stop that the hand wheel may be readily turned. The hand wheel is now rotated to the left until the pointer indicates the desired cut-off has been reached, whereupon the handle is thrown. When the handle is turned to the left, the screw 12 moves forwardly with respect to the piston, first covering the port 26$^a$ and then connecting it with the exhaust port 28 so that the pressure in the rear end of the cylinder exhausts, whereupon the piston is moved rearwardly until the collar 16 comes against the stop 26 when it is in the position giving the cut-off registered by the indicator. If, for example, it is desired to go from full forward to full rear position of the piston the hand wheel is turned continuously to the left at a rate such that the valve is held in proper position despite the fact that the piston is moving rearwardly.

A second stop 29 is provided to limit the forward movement of the collar 16 and hence of the screw 12 and the piston 8. The distance between the two faces 26 and 29 is preferably ½-inch longer than the length of the collar 16 from face to face. By this arrangement I provide the necessary freedom required for manual adjustment of the valve to effect cut-off adjustment, while at the same time if the locomotive is in the roundhouse, or elsewhere, with no air on, or if there should be an air failure on the road, it is impossible for the piston to move more than ½-inch, whereas in many gears on the market it is possible for the piston to move quite a few inches. The desirability of this feature will be apparent from the fact that many accidents have occurred in the roundhouse when air has been turned on, because, despite the fact that the reverse lever is in neutral position, the piston may not be, so that the engine moves.

Furthermore, provision of these stops permits me to manually shift the position of the piston to effect cut-off adjustment if there should be an air failure because the stops will act as fulcrums for the collar 16, whereupon rotation of the hand wheel will cause the shaft 12 to turn to move the piston. In order to facilitate this operation, I interpose rings 30 of anti-friction material between the collar 16 and the collar 31 on the shaft 12.

It will be apparent that the piston will be cushioned on its forward face in making all adjustments, which is advantageous for the reason that the load on the piston is normally in a forward direction. It will also be apparent that any degree of cut-off adjustment may be secured. It will also be seen that there is no thrust transmitted thru the gear to the hand wheel and indicator mechanism. The construction is simple, it being necessary only to provide parts of requisite strength and to provide a proper differential area between the two faces of the piston. It is also possible to simplify the packing of the piston, if desired, because leakage from the forward face to the rear face introduces no operating difficulties, and grip of the cup leathers on the cylinder to help hold the piston is not required. The gear is also cushioned in its rearward movement when making adjustments, because, in rearward movement of the piston, the valve is repeatedly shifted to crack the port 26ᵃ to admit pressure and because the valve ordinarily has only opportunity to crack the port to exhaust when it is shifted back, the net result of cracking to pressure and cracking to exhaust being to maintain a pressure on the rear face sufficient to cushion and sufficient to relieve the thrust for ready manual operation.

What I claim is:

1. In a locomotive power reverse gear mechanism, the combination of a cylinder, a piston, a source of fluid pressure, means normally subjecting one side of said piston to the fluid pressure in order to urge it at all times in one direction, a conduit for supplying fluid pressure to the other side of the piston, a valve for controlling the supply and exhaust of fluid through said conduit, a servo-governor connection between said valve and the piston, and stop means associated with said connection for arresting movement of the piston when the servo-governor connection is not being adjusted.

2. In a locomotive power reverse gear mechanism, the combination of a cylinder, a differential piston, a source of fluid pressure, means at all times subjecting the smaller side of said piston to the fluid pressure, a conduit normally connecting the cylinder on the larger side of the piston to the atmosphere, means for closing said atmospheric connection and supplying fluid pressure to the larger side of the piston, a valve for controlling the pressure fluid so supplied to the larger side of the piston, a servo-governor connection between valve and piston, and stop means cooperating with said connection to hold the piston against movement when the supply of pressure fluid to the larger side is cut off.

3. In a locomotive power reverse gear mechanism, the combination of a cylinder, a piston adapted to reciprocate therein, a source of fluid pressure, a valve, a servo-governor connection between valve and piston, means at all times subjecting one side of said piston to fluid pressure from said source, and a stop means cooperating with said connection to prevent movement of the piston under the influence of said pressure at times when the servo-governor connection is not being actuated.

4. In a locomotive power reverse gear mechanism, the combination of a cylinder, a piston adapted to reciprocate therein, a source of fluid pressure, a valve controlling the supply of fluid pressure to one side of said piston, a servo-governor connection between valve and piston, means at all times subjecting the other side of said piston to fluid pressure from said source, and a stop means cooperating with said connection to prevent movement of the piston under the influence of said constantly applied pressure when the servo-governor connection is not being adjusted.

5. A locomotive power reverse gear comprising in combination, a cylinder, a piston, means at all times supplying fluid pressure to the cylinder on one side of the piston, a stop, a member having an adjustable connection with said piston and normally adapted to transmit the thrust of the piston to said stop to prevent movement of the piston under the influence of said constant supply of fluid pressure, a port normally connecting the opposite side of the cylinder to the atmosphere, means shutting off said connection to the atmosphere and for supplying said opposite side of the cylinder with fluid pressure, an exhaust port for said opposite side of the cylinder, a valve normally closing said exhaust port but adapted to be moved to shut off the supply of fluid to said opposite end and to establish exhaust through said exhaust port, a connection between said valve and said member whereby the valve can be moved by said member to effect the control just specified, and means for progressively adjusting the connection between said member and the piston.

6. In a locomotive power reverse gear mechanism, the combination of a cylinder, a piston, means at all times supplying fluid pressure to the cylinder on one side of the piston, means normally connecting the opposite side to the atmosphere, a stop, means extending between said piston and said stop adjustable to vary the distance between the two, said means normally abutting against said stop to positively prevent movement of the piston under the influence of said pressure, means for supplying fluid pressure to said opposite side at will, and means for effecting adjustment of the distance between said piston and said stop as aforesaid.

7. In a locomotive power reverse gear mechanism, the combination of a cylinder, a piston, means at all times supplying fluid pressure to the cylinder on one side of the piston, means normally connecting the opposite side to the atmosphere, a stop, a member normally transmitting thrust from the piston to the stop to positively prevent movement of the piston under the influence of said pressure, means for supplying fluid pressure to said opposite side at will, and means for moving said piston with relation to said member to vary the distance between the piston and the stop.

8. In a locomotive power reverse gear mechanism, the combination of a cylinder, a piston, means at all times supplying fluid pressure to the cylinder on one side of the piston, means normally connecting the opposite side to the atmosphere, a stop for positively preventing movement of the piston under the influence of said pressure, means for supplying fluid pressure to said opposite side at will, and means for adjusting the position of the piston in said cylinder in relation to said stop.

9. In a locomotive power reverse gear mechanism, the combination of a cylinder, a piston, means at all times supplying fluid pressure to the cylinder on one side of the piston, means normally connecting the opposite side to the atmosphere, a stop for positively preventing movement of the piston under the influence of said pressure, means for supplying pressure to the side of the cylinder which is normally connected to the atmosphere sufficient to move the piston against said first pressure, and means permitting utilization of pressure in one side or the other of said cylinder to cause movement of the piston in one direction or the other as desired.

10. In a locomotive power reverse gear mechanism, the combinatoin of a cylinder, a piston, means at all times supplying fluid pressure to the cylinder on one side of the piston, means normally connecting the opposite side to the atmosphere, a stop, a rod having a threaded connection to said piston and normally transmitting thrust from the piston to said stop to positively prevent movement of the piston under the influence of said pressure, means for rotating said screw in one direction so as to permit said pressure to move the piston toward said stop, and means for supplying pressure to the side of the cylinder which is normally connected to the atmosphere sufficient to move the piston in the opposite direction against said first pressure, said screw being rotated at such times in the opposite direction to effect such reverse movement of the piston.

11. In a locomotive power reverse gear mechanism, the combination of a cylinder, a piston, a source of fluid pressure, means normally subjecting one side of said piston to the fluid pressure in order to urge it at all times in one direction, a conduit normally connecting the other side to the atmosphere, means for supplying fluid pressure to the piston through said conduit, a valve for controlling the supply and exhaust of fluid so supplied, a servo-governor connection between said valve and the piston, means for adjusting said servo-governor connection, and stop means associated with said servo-governor connection for positively arresting movement of the piston under the influence of said constantly supplied pressure, the pressure supplied through said atmospheric conduit being sufficient to overcome said constantly supplied pressure.

12. A power reverse gear comprising in combination, a cylinder, a piston, a stop, a member extending between the piston and the stop which is adjustable with respect to the piston to vary the distance between the piston and the stop, means normally supplying fluid pressure to the piston in a direction which forces said member against said stop, the other side of said piston normally being open to the atmosphere, means for supplying pressure at will to said other side sufficient to overcome said first pressure and force the piston in the opposite direction, means for adjusting said member as aforesaid to effect the desired movement of the piston when the pressure has been supplied to said other side, and a valve associated with said member adapted to cut off said pressure and exhaust said other side during a period of adjustment in the direction of said first pressure.

13. A power reverse gear comprising in combination, a cylinder, a piston, a stop, a member extending between the piston and the stop which is adjustable with respect to the piston to vary the distance between the piston and the stop, means normally suplying fluid pressure to the piston in a direction which forces said member against said stop, the other side of said piston normally being open to the atmosphere, means for supplying pressure at will to said other side sufficient to overcome said first pressure and force the piston in the opposite direction, means for adjusting said member as aforesaid to effect the desired movement of the piston when the pressure has been supplied to said other side, and a valve associated with said member adapted to cut off said pressure and exhaust said other side during a period of adjustment in the direction of said first pressure, said valve being held in a position which maintains the supply of fluid to said other side during a period of adjustment in the opposite direction.

14. In a power reverse gear, the combination of a cylinder, a piston, a stop, means at all times supplying fluid pressure to the cylinder on one side of the piston, a member having a threaded connection with the piston and normally abutting against said stop to prevent movement of the piston under the influence of said pressure, a port normally connecting the other side of the cylinder to the atmosphere, means for closing said atmospheric port and for supplying said opposite side with pressure, an exhaust port, a valve connected to move with said member and adapted to control both the exhaust port and said means for supplying the opposite side with pressure, and means for turning the member having the threaded connection with the piston, such turning acting to move the valve in one direction or the other so as to permit the fluid pressure to move the piston in the direction desired.

15. A power reverse gear mechanism comprising in combination, a cylinder, a piston, a source of fluid pressure, means at all times connecting the cylinder on one side of the piston to said source of fluid pressure, means normally connecting the opposite to the atmosphere, means for shutting off said atmospheric connection and for supplying said opposite side with fluid pressure from said source, an exhaust port for said opposite side, a valve for controlling said exhaust port and the fluid pressure so supplied to said opposite side, a connection between the piston and said valve which causes the device to function as a servo-governor when pressure is supplied to said opposite side as aforesaid, a stop cooperating with said connection to positively hold the piston against movement under the influence of said constant supply of pressure when the opposite side is open to the atmosphere, and means for adjusting the connection between the piston and the valve to vary the distance between the piston and the stop.

In testimony whereof, I have hereunto signed my name.

MONTAGUE H. ROBERTS.